(12) United States Patent
Shinya

(10) Patent No.: US 12,425,521 B2
(45) Date of Patent: Sep. 23, 2025

(54) INSPECTION APPARATUS AND METHOD OF CONTROLLING THE SAME, AND STORAGE MEDIUM, THAT CONVERT STORED FIRST REFERENCE IMAGE USABLE IN JOB TO BE INSPECTED TO SECOND REFERENCE IMAGE CORRESPONDING TO THE JOB

(71) Applicant: CANON KABUSHIKI KAISHA, Tokyo (JP)

(72) Inventor: Takeshi Shinya, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 18/489,198

(22) Filed: Oct. 18, 2023

(65) Prior Publication Data

US 2024/0135528 A1 Apr. 25, 2024
US 2024/0233115 A9 Jul. 11, 2024

(30) Foreign Application Priority Data

Oct. 21, 2022 (JP) .................................. 2022-169399

(51) Int. Cl.
*H04N 1/00* (2006.01)
*G06T 7/00* (2017.01)
(Continued)

(52) U.S. Cl.
CPC ......... *H04N 1/00005* (2013.01); *G06T 7/001* (2013.01); *G06T 7/30* (2017.01);
(Continued)

(58) Field of Classification Search
CPC ........... H04N 1/00005; H04N 1/00015; H04N 1/00023; H04N 1/2323; H04N 1/2338;
(Continued)

(56) References Cited

U.S. PATENT DOCUMENTS 8,780,378 B2 * 7/2014 Yamamoto ........... G06V 10/751
358/1.14
9,183,434 B2 * 11/2015 Muraishi ................... G06T 7/33
(Continued)

FOREIGN PATENT DOCUMENTS

JP 2021043032 A 3/2021

OTHER PUBLICATIONS

Extended European search report issued in European Appln. No. 23204068.3 mailed on Mar. 21, 2024.

*Primary Examiner* — Scott A Rogers
(74) *Attorney, Agent, or Firm* — ROSSI, KIMMS & McDOWELL LLP

(57) ABSTRACT

The inspection apparatus performs first image processing on image data used in printing the image, and stores image data for which the first image processing has been performed as a reference image. The inspection apparatus determines whether a first reference image corresponding to a reference image that can be used in a job to be inspected is stored, and if it is determined that the corresponding first reference image is stored, performs second image processing on the first reference image to convert the first reference image into a second reference image corresponding to the job. The inspection apparatus obtains a scanned image by reading an image of paper on which printing has been performed according to the job and performs processing for matching the obtained scanned image and the second reference image.

20 Claims, 9 Drawing Sheets

(51) Int. Cl.
*G06T 7/30* (2017.01)
*H04N 1/387* (2006.01)
*H04N 1/40* (2006.01)
*H04N 1/60* (2006.01)

(52) U.S. Cl.
CPC ..... *H04N 1/00015* (2013.01); *H04N 1/00023* (2013.01); *H04N 1/00034* (2013.01); *H04N 1/00039* (2013.01); *H04N 1/00074* (2013.01); *H04N 1/0009* (2013.01); *H04N 1/387* (2013.01); *H04N 1/40068* (2013.01); *H04N 1/6097* (2013.01); *G06T 2207/30144* (2013.01)

(58) Field of Classification Search
CPC .... H04N 1/387; H04N 1/40068; H04N 1/603; H04N 1/6097; H04N 1/00026–0009; H04N 1/3877–3935; G06T 7/001; G06T 7/30; G06T 3/40; G06T 3/60; G06T 2207/30144
See application file for complete search history.

(56) References Cited

U.S. PATENT DOCUMENTS

| | | | |
|---|---|---|---|
| 11,379,962 B2* | 7/2022 | Mimura | G06T 7/0002 |
| 11,941,305 B2* | 3/2024 | Ayukawa | H04N 1/00015 |
| 12,149,659 B2* | 11/2024 | Hara | H04N 1/00005 |
| 2013/0148987 A1 | 6/2013 | Arakawa | |
| 2013/0301083 A1* | 11/2013 | Kaneda | H04N 1/00005 358/406 |
| 2014/0079293 A1 | 3/2014 | Kitai et al. | |
| 2018/0063339 A1* | 3/2018 | Pantin | H04N 1/00045 |
| 2019/0394355 A1* | 12/2019 | Morita | H04N 1/6097 |
| 2021/0073966 A1 | 3/2021 | Teshima et al. | |
| 2023/0084850 A1* | 3/2023 | Ichimi | G06F 3/1205 358/1.15 |
| 2023/0401695 A1* | 12/2023 | Shinya | G06T 7/001 |
| 2024/0029238 A1* | 1/2024 | Daiku | G06T 7/11 |
| 2024/0320819 A1* | 9/2024 | Nakamura | H04N 1/00015 |

* cited by examiner

FIG. 9A

CMYK to RGB TABLE

| C | M | Y | K | R | G | B |
|---|---|---|---|---|---|---|
| 0 | 0 | 0 | 0 | 255 | 255 | 255 |
| 31 | 0 | 0 | 0 | 230 | 240 | 255 |
| 63 | 0 | 0 | 0 | 200 | 220 | 255 |

...

| 255 | 255 | 255 | 255 | 0 | 0 | 0 |

FIG. 9B

RGB to RGB TABLE

| R | G | B | R | G | B |
|---|---|---|---|---|---|
| 255 | 255 | 255 | 220 | 220 | 220 |
| 230 | 240 | 255 | 200 | 215 | 220 |
| 200 | 220 | 255 | 170 | 210 | 220 |

...

| 0 | 0 | 0 | 3 | 3 | 3 |

FIG. 9C

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

INSPECTION APPARATUS AND METHOD OF CONTROLLING THE SAME, AND STORAGE MEDIUM, THAT CONVERT STORED FIRST REFERENCE IMAGE USABLE IN JOB TO BE INSPECTED TO SECOND REFERENCE IMAGE CORRESPONDING TO THE JOB

BACKGROUND OF THE INVENTION

Field of the Invention

The present invention relates to an inspection apparatus and a method of controlling the same, and a storage medium.

Description of the Related Art

Staining may occur in print products printed and outputted from printing apparatuses due to ink, toner, and other coloring materials adhering to unintended places. Alternatively, a color omission in which colors end up more faded than an original color in places where an image is formed due to insufficient coloring material adhering in those places may occur. So-called image defect, such as staining and color omissions, degrade the quality of printed products. Therefore, it is necessary to inspect the printed product for such defects and to guarantee the quality of the printed product.

Since visual inspection in which inspectors visually inspect the presence or absence of aforementioned defects requires a lot of time and cost, in recent years inspection systems that perform inspection automatically without relying on visual observation by a human have been proposed. Specifically, such systems determine the image quality of the printed product by detecting the presence or absence of defects by aligning a digital image (reference image), which is used for printing, and a scanned image obtained by scanning a printed product and executing image matching and determination processing.

Japanese Patent Laid-Open No. 2021-43032 proposes a method of performing high-speed processing in an image matching technique for converting a digital image into a reference image and comparing the reference image and a scanned image. This method realizes high-speed processing by performing reference image generation processing in which rasterization (RIP) processing is performed on image data inputted as a job prior to executing the job.

However, there is a problem that if processing for generating all the reference images from image data inputted as a job is always executed prior to the job being executed, the time required for processing a job increases due to it taking time to generate the reference images.

SUMMARY OF THE INVENTION

Embodiments of the present disclosure eliminate the above-mentioned issues with conventional technology.

A feature of embodiments of the present disclosure is to provide a technique that allows efficient generation of a reference image while maintaining high-speed image matching performed by comparison with the reference image.

According to embodiments of the present disclosure, there is provided an inspection apparatus operable to inspect an image printed on paper, the inspection apparatus comprising: a controller including one or more memories storing instructions and one or more processors configured to execute the instructions, the controller configured to: perform first image processing on image data used in printing the image; store image data for which the first image processing has been performed as a reference image; determine whether a first reference image corresponding to a reference image that can be used in a job to be inspected is stored; upon determining that the corresponding first reference image is stored, perform second image processing on the first reference image to convert the first reference image into a second reference image corresponding to the job; obtain a scanned image by reading an image of paper on which printing has been performed according to the job; and perform processing for matching the obtained scanned image and the second reference image.

According to embodiments of the present disclosure, there is provided a method of controlling an inspection apparatus operable to inspect an image printed on paper, the method comprising: performing first image processing on image data used in printing the image; storing the image data for which the first image processing has been performed as a reference image in a memory; determining whether a first reference image corresponding to a reference image that can be used in a job to be inspected is stored in the memory; upon determining that the corresponding first reference image is stored in the memory, performing, on the first reference image, second image processing for converting the first reference image into a second reference image corresponding to the job; obtaining a scanned image by reading an image of paper on which printing has been performed according to the job; and performing processing for matching the obtained scanned image and the second reference image.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIGS. 9A and 9B are diagrams illustrating color conversion tables according to the first embodiment.

FIG. 9C is a diagram illustrating an equation for an affine transform.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

First Embodiment

Figure 1:
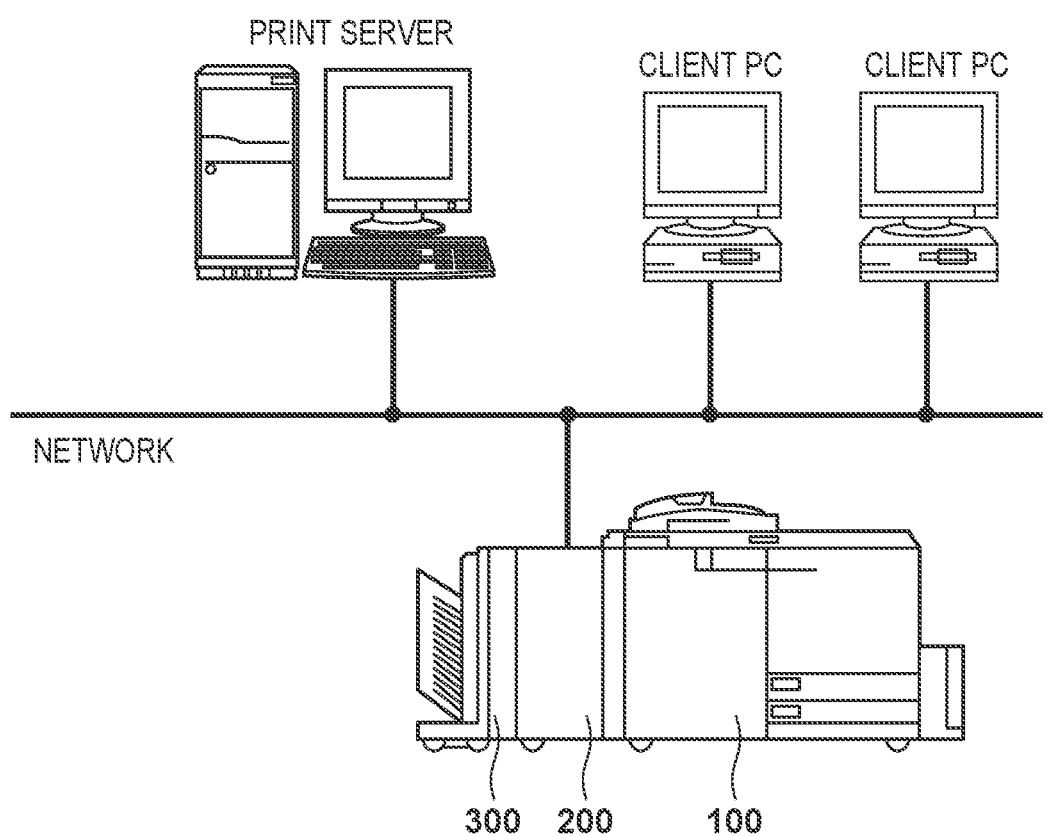
FIG. 1 is a diagram illustrating an example of a configuration of a system that includes an inspection apparatus according to a first embodiment of the present invention.

FIG. 1 is a diagram illustrating an example of a configuration of a system that includes an inspection apparatus 200 according to a first embodiment of the present invention.

An image forming apparatus 100 performs print output by processing various kinds of input data. The inspection apparatus 200 receives a printed product printed and discharged by the image forming apparatus 100 and inspects the contents of the printed product. A finisher 300 receives output paper (the printed product) inspected by the inspection apparatus 200 and performs post processing, such as book binding. The image forming apparatus 100 is connected to an external print server or client PC via a network. The inspection apparatus 200 is connected to the image forming apparatus 100 on a one-to-one basis via a communication cable. The finisher 300 is connected to the image forming apparatus 100 on a one-to-one basis via another communication cable. The inspection apparatus 200 and the finisher 300 are also connected to each other via yet another communication cable. The image forming apparatus 100, the inspection apparatus 200, and the finisher 300 can thus communicate with each other. In the first embodiment, an in-line inspection system in which image formation, image inspection, and finishing are performed from start to finish is illustrated.

Figure 2:
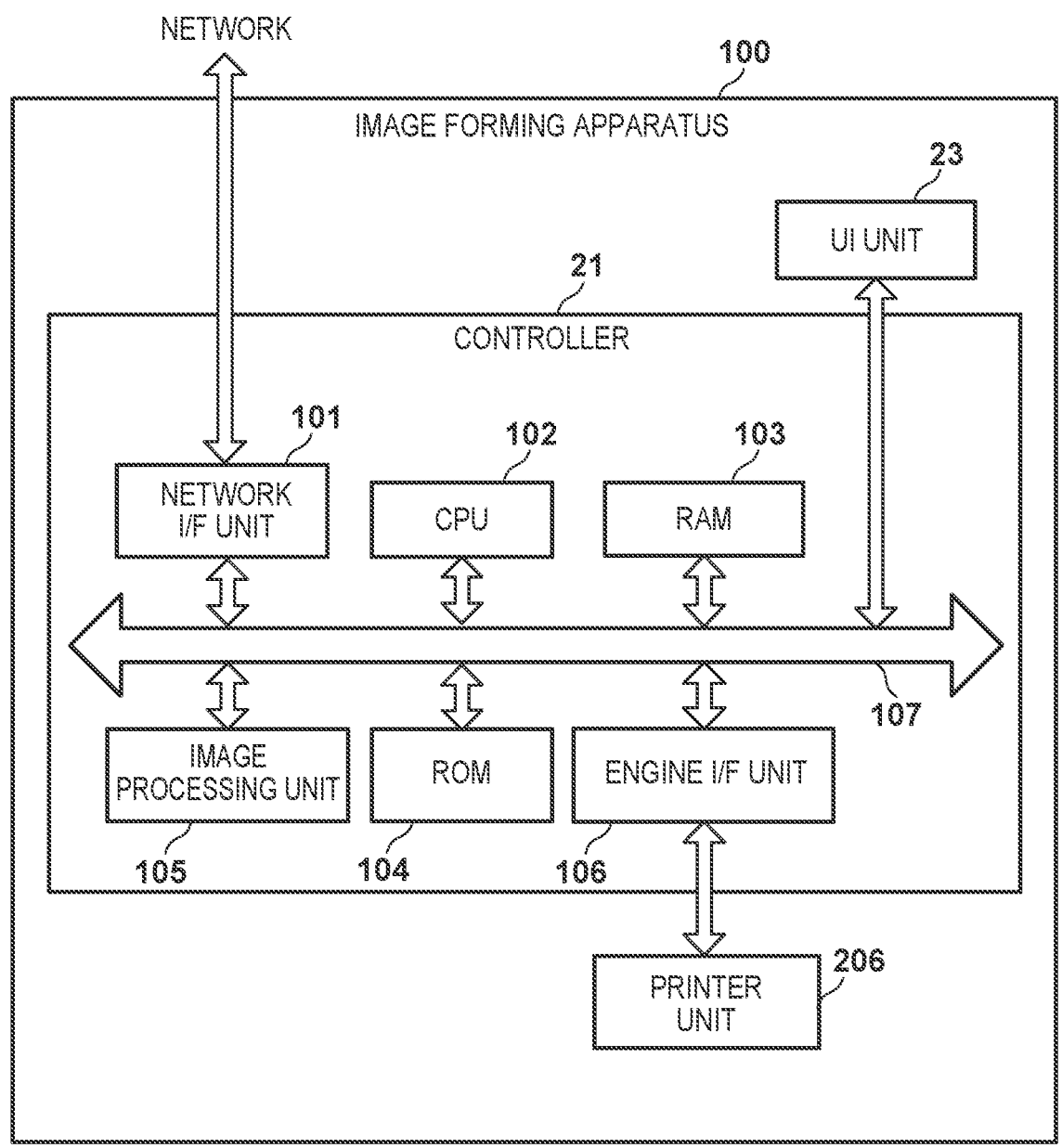
FIG. 2 is a block diagram for explaining a hardware configuration of an image forming apparatus according to the first embodiment.

FIG. 2 is a block diagram for explaining a hardware configuration of the image forming apparatus 100 according to the first embodiment.

The image forming apparatus 100 is an example of the image forming apparatus according to the present invention and includes a controller 21, a printer unit 206, and a user interface (UI) unit (operation unit) 23. The UI unit 23 includes various switches, a display, and the like for operation.

Image data and document data created by a software application, such as printer driver (not illustrated) on a client PC or a print server on a network, are transmitted to the image forming apparatus 100 as page description language (PDL) data via a network (e.g., a local area network). In the image forming apparatus 100, the controller 21 receives the transmitted PDL data. The controller 21 is connected to the printer unit 206 and, upon receiving PDL data from the client PC or the print server, converts that PDL data into print data that can be processed by the printer unit 206 and outputs that print data to the printer unit 206.

The printer unit 206 prints an image based on the print data outputted from the controller 21. It is assumed that the printer unit 206 according to the first embodiment is an electrophotographic printer engine. However, the printing method is not limited thereto and may be, for example, an inkjet (IJ) method.

The UI unit 23 is operated by a user and is used by the user to select various functions and perform operation instructions. The UI unit 23 includes, for example, a display unit provided with a touch panel on the surface and a keyboard in which various keys, such as a start key, a stop key, and a numeric keypad, and the like are arranged.

Next, the details of the controller 21 will be described. The controller 21 includes a network interface (I/F) unit 101, a CPU 102, a RAM 103, a ROM 104, an image processing unit 105, an engine interface (I/F) unit 106, and an internal bus 107. The network I/F unit 101 is an interface for receiving PDL data transmitted from the client PC or the print server. The CPU 102 controls the entire image forming apparatus 100 using programs and data stored in the RAM 103 or the ROM 104 and performs later-described processing performed by the controller 21. The RAM 103 provides a work area that the CPU 102 uses when executing various kinds of processing. The ROM 104 stores computer programs and data for executing various kinds of later-described processing in the CPU 102, setting data of the controller 21, and the like.

The image processing unit 105 generates print data that can be processed by the printer unit 206 by performing image processing for printing on PDL data received by the network I/F unit 101 according to settings from the CPU 102. The image processing unit 105 generates image data (RIP data) that has a plurality of color components per pixel, in particular by performing rasterization on the received PDL data. A plurality of color components are independent color components in a color space, such as red, green, and blue (RGB). The image data has a value of, for example, 8 bits (256 tones) per color component for each pixel. That is, the image data is multi-value bitmap data that includes multi-value pixel data. In the aforementioned rasterization, attribute data, which indicates the attribute of the pixel of the image data for each pixel is also generated in addition to the image data. This attribute data indicates what type of object the pixel belongs to and is a value that indicates the type of object, such as a character, a line, a graphic, an image, or a background. The image processing unit 105 generates print data by performing image processing, such as color conversion from an RGB color space to a cyan, magenta, yellow, and black (CMYK) color space and screen processing using the generated image data and attribute data.

The engine I/F unit 106 is an interface for transmitting print data generated by the image processing unit 105 to the printer unit 206. The internal bus 107 is a system bus for transmitting control signals and the like by connecting the respective above-described units.

Figure 3:
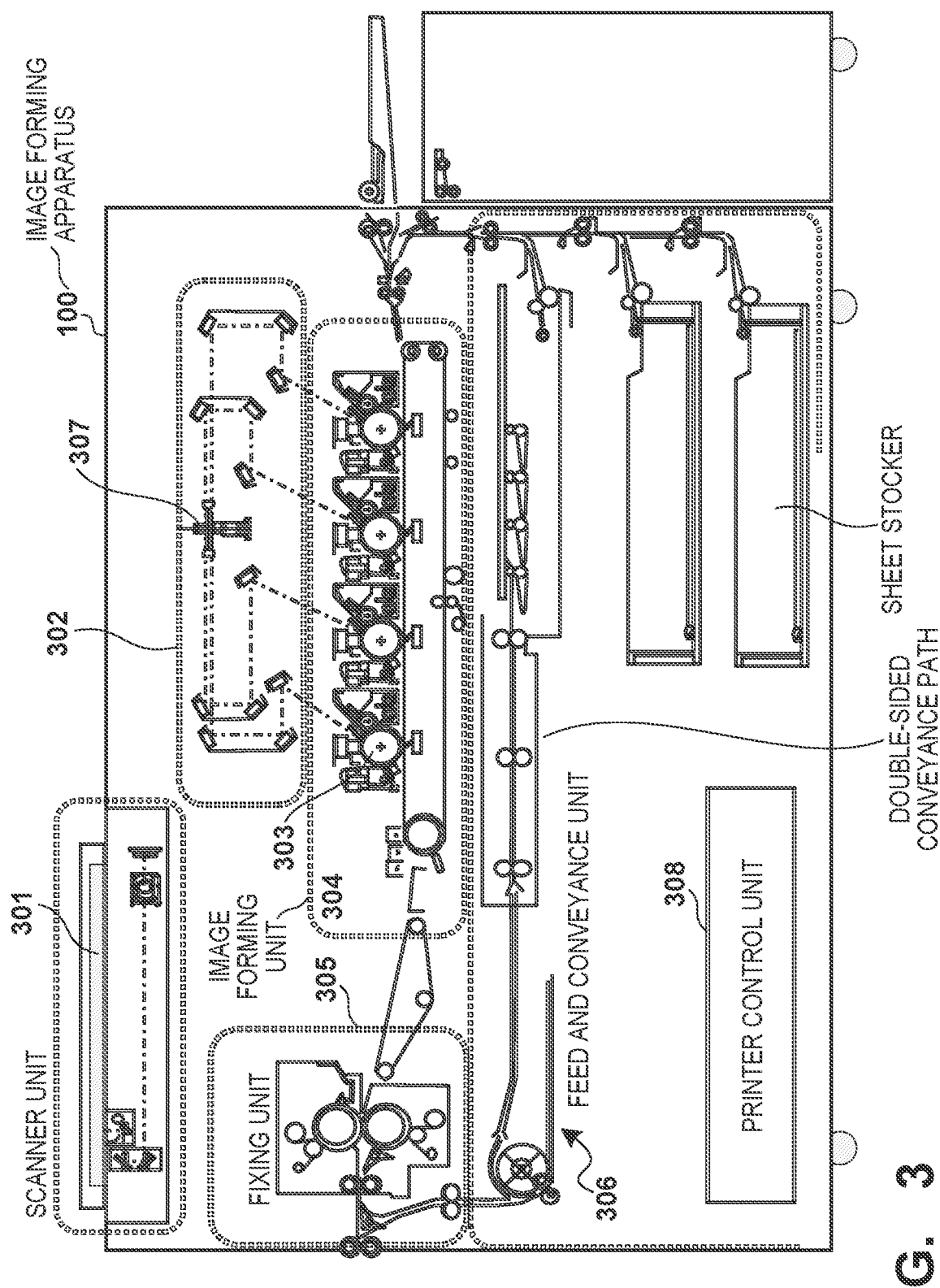
FIG. 3 is a diagram for explaining a mechanism of the image forming apparatus according to the first embodiment.

FIG. 3 is a diagram for explaining a mechanism of the image forming apparatus 100 according to the first embodiment.

The image forming apparatus 100 includes a scanner unit 301, a laser exposure unit 302, photosensitive drums 303, an image forming unit 304, a fixing unit 305, a feed/conveyance unit 306, and a printer control unit 308, which controls these. The scanner unit 301 generates image data by optically reading an image of a document placed on a document table by illuminating the document and converting that image into an electric signal. The laser exposure unit 302 causes a light beam, such as a laser beam modulated according to the image data, to enter a rotating polygonal mirror 307, which rotates at constant angular speed, and thereby irradiates scanning light reflected off of the rotating polygonal mirror 307 onto the photosensitive drums 303. The image forming unit 304 drives the photosensitive drums 303 to rotate, charges them with chargers, and develops latent images respectively formed on the photosensitive drums by the laser exposure unit 302 using toner. It then transfers that toner images to paper and collects the small amount of toner not been transferred at that time and remaining on the photosensitive drums; image formation is realized by having four developing units (developing stations), each for a series of electrophotographic processes as such.

The four developing units arranged in the order of cyan (C), magenta (M), yellow (Y), and black (K) sequentially execute magenta, yellow, and black image forming operations after a predetermined time has elapsed from the start of image formation of the cyan station.

The fixing unit 305 includes a roller, a belt, and the like and further contains a heat source, such as a halogen heater, and melts and fixes the toner onto paper to which toner images have been transferred by the image forming unit 304 using heat and pressure. When performing printing on thick paper, since the paper is thick and poor in heat conductance, the speed at which the paper passes the fixing unit 305 needs to be, for example, half of the usual speed. Accordingly, when performing printing on thick paper, paper conveyance speeds of respective units other than the fixing unit 305 are also halved, and thus, the printing speed of the image forming apparatus 100 itself is halved.

The feed/conveyance unit 306 includes at least one sheet stocker, which is typified by a paper cassette or a paper deck, and separates one sheet of paper (paper) from a plurality of papers stored in the sheet stocker according to an instruction from the printer control unit 308 and conveys the paper to the image forming unit 304. The toner images of respective colors are transferred by the aforementioned developing station to the paper thus conveyed, and in the end, a full-color toner image is formed on the paper. When forming an image on both sides of the paper, control is performed such that upon passing through the fixing unit 305, paper is made to pass through a conveyance path for conveyance to the image forming unit 304 again.

The printer control unit 308 communicates with the controller 21, which controls the entire image forming apparatus 100, and executes control according to its instruction. The printer control unit 308 performs instructions, such that the entire apparatus can maintain harmony and operate smoothly, while managing the states of the respective above-described scanner, laser exposure, image forming, fixing, and feed/conveyance units.

Figure 4A:
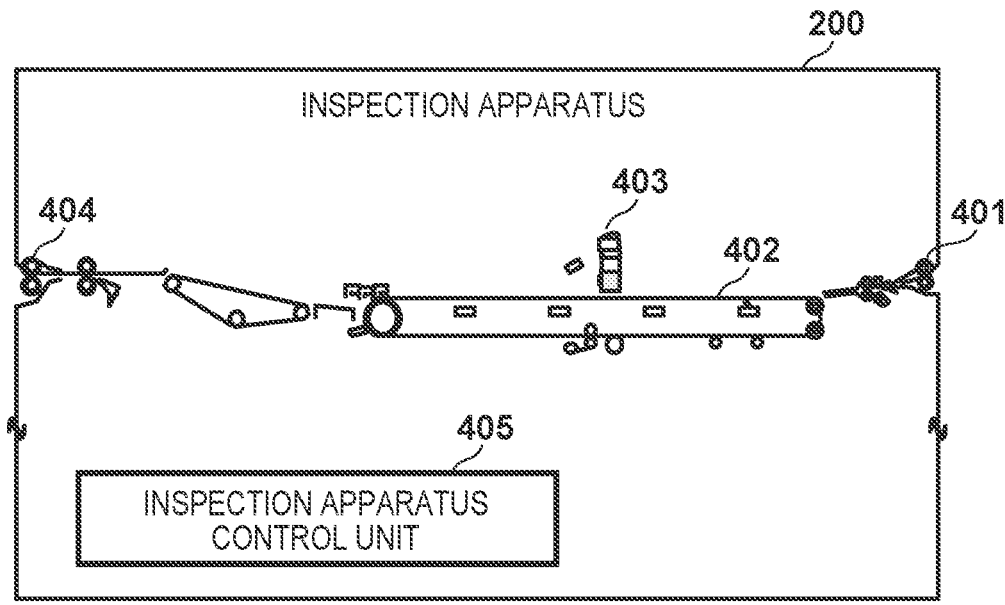
FIG. 4A is a diagram for explaining an overview of an internal configuration diagram of the inspection apparatus according to the first embodiment.

FIG. 4A is a diagram for explaining an overview of an internal configuration diagram of the inspection apparatus 200 according to the first embodiment.

Paper (printed product) outputted from the image forming apparatus 100 is pulled into the inspection apparatus 200 by a feed roller 401. The printed product is then read by an inspection sensor 403 above a conveyance belt 402 while being conveyed by the conveyance belt 402. The inspection apparatus control unit 405 performs inspection processing using the image data (scanned image) obtained by the inspection sensor 403 reading the printed product. The inspection apparatus control unit 405 also controls the entire inspection apparatus 200. A result of such an inspection is sent to the finisher 300. The inspected printed product is discharged by the discharge roller 404. Although not illustrated here, the inspection sensor 403 may also have a structure in which the inspection sensor performs reading from the underside of the conveyance belt 402 so as to be capable of handling a double-sided printed product.

Figure 4B:
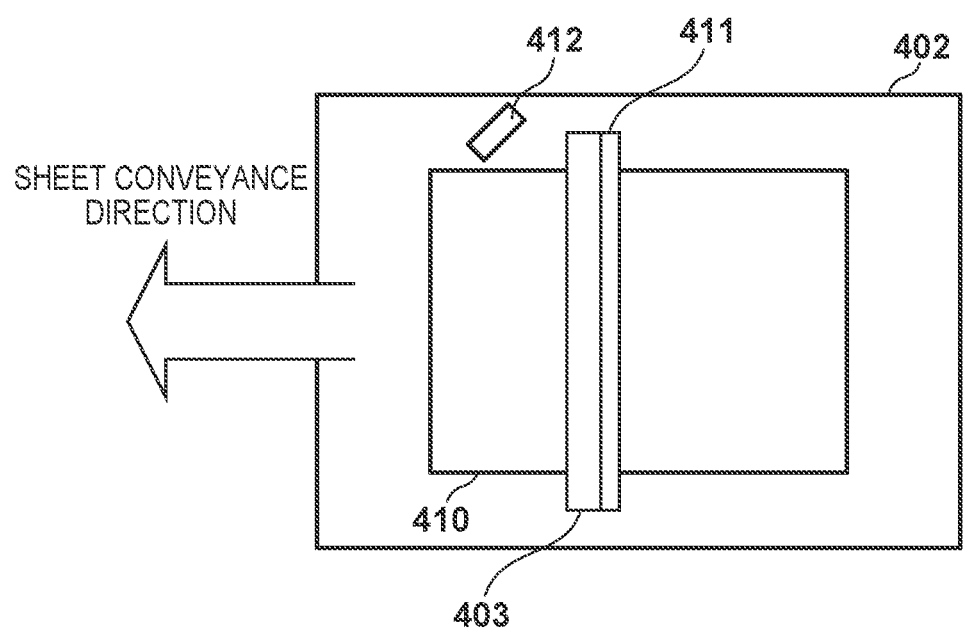
FIG. 4B depicts a top view of a conveyance belt viewed from an inspection sensor side.

FIG. 4B depicts a top view of the conveyance belt 402 viewed from the inspection sensor 403 side.

Here, the inspection sensor 403 is a line sensor for reading an image of the entire surface of a printed product 410, which has been conveyed as illustrated, for each line. An irradiation device 411 irradiates the printed product 410 at the time of reading by the inspection sensor 403. A skew feeding detection irradiation device 412 is a device for detecting whether the printed product 410 is skewed with respect to a conveyance direction when being conveyed on the conveyance belt 402. The skew feeding detection irradiation device 412 detects skew feeding of the printed product 410 by irradiating light onto the conveyed printed product 410 from a diagonal direction, so that the inspection sensor 403 reads an image of a shadow of an edge portion of the printed product 410. In the first embodiment, a configuration is such that the inspection sensor 403 reads the image of the shadow of the edge portion of the printed product 410; however, a configuration may be such that another reading sensor aside from the inspection sensor 403 is used.

Figure 5:
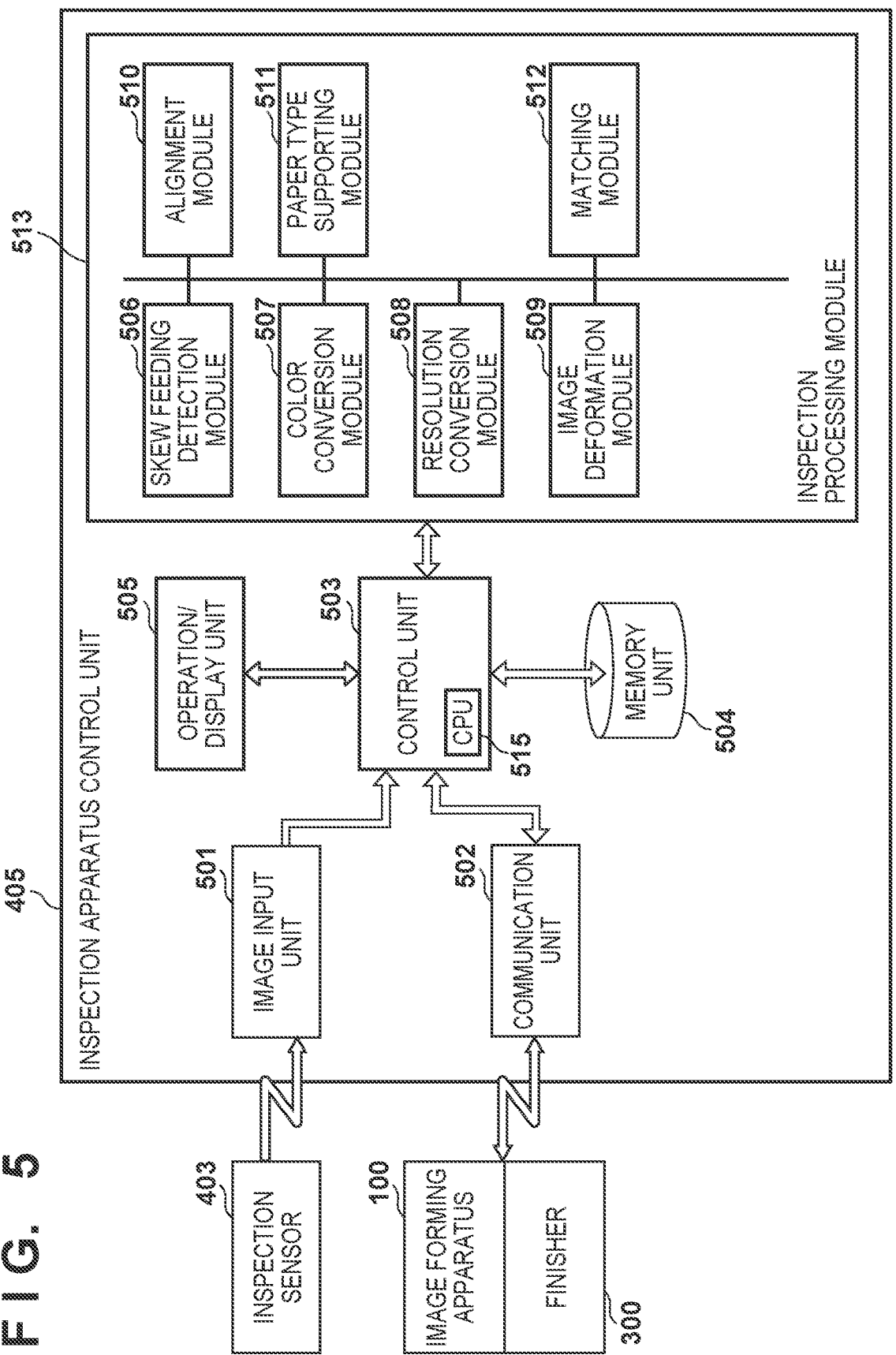
FIG. 5 is a block diagram for explaining a configuration of an inspection apparatus control unit of the inspection apparatus according to the first embodiment.

FIG. 5 is a block diagram for explaining a configuration of the inspection apparatus control unit 405 of the inspection apparatus 200 according to the first embodiment.

A control unit 503 performs full control of the inspection apparatus control unit 405. The control unit 503 includes a CPU 515, and the CPU 515 executes various kinds of later-described processing by deploying programs stored in a memory unit 504 in a memory (not illustrated) of the control unit 503 and executing them. An image input unit 501 receives a scanned image obtained by reading a printed product by the inspection sensor 403. The CPU 515 stores the received scanned image in the memory unit 504. A communication unit 502 communicates with the controller 21 of the image forming apparatus 100. This communication is reception of image data (a reference image), which is used for printing and corresponds to the scanned image, and transmission and reception of inspection control information. The CPU 515 also stores the received reference image and the inspection control information in the memory unit 504.

One of the pieces of inspection control information exchanged with the image forming apparatus 100 is synchronization information for achieving correspondence between scanned images (inspection images) and reference images, such as print job information, copy count information, and page order information. Others are inspection result information and control information for controlling the operation of the image forming apparatus 100 accordingly. The synchronization information is necessary for synchronizing scanned images and reference images for when the order of scanned images received by the inspection apparatus 200 and reference images used for printing the scanned images are different due to double-sided printing or printing of a plurality of copies. The synchronization information is also necessary for synchronizing a reference image and scanned images due to there being cases where one reference image corresponds to a plurality of scanned images. The inspection control information to be exchanged between the inspection apparatus 200 and the finisher 300 is inspection result information and control information for controlling the operation of the finisher 300 accordingly.

The operation of an inspection processing module 513 is controlled by the CPU 515 of the control unit 503. The inspection processing module 513 performs inspection processing for sequentially inspecting a corresponding scanned image and reference image pair based on the aforementioned synchronization information, which is one piece of the inspection control information exchanged with the image forming apparatus 100. The details of the inspection processing module 513 will be described later. Upon completion of the inspection processing, a determination result thereof is sent to the control unit 503 and displayed on an operation/display unit 505. If it is deemed that there is an image defect as a result of this determination, control of the image forming apparatus 100 and the finisher 300 is switched via the communication unit 502 by a method designated in advance by the user via the operation/display unit 505. For example, processing, such as stopping image forming processing by the image forming apparatus 100 and switching a discharge tray of the finisher 300 to an escape tray, is performed.

Next, a functional configuration of the inspection processing module 513 will be described. The functions of the inspection processing module 513 are achieved by the CPU 515 deploying programs stored in the memory unit 504 into the memory of the control unit 503 and executing them.

A skew feeding detection module 506 is a module for detecting a skew angle of a scanned image. As previously described with reference to FIG. 4B, a scanned image is scanned such that a shadow is made at an edge portion of a printed product. This is for the inspection sensor 403 to scan a shadow made at an edge portion of a printed product when the skew feeding detection irradiation device 412 irradiates a printed product pulled into the inspection apparatus 200 and conveyed on the conveyance belt 402. A skew angle of a printed product is detected using this shadow. Based on the skew angle thus detected, correction processing is performed in an image deformation module 509, which will be described later.

A color conversion module 507 is a module for converting colors of a reference images into moderate colors. The reference image is rasterized in a CMYK color space by the image processing unit 105. Meanwhile, a scanned image to be inspected is rendered in an RGB color space read by the inspection sensor 403. Therefore, the reference image needs to be color-converted from the CMYK color space to the RGB color space; however, RGB values of the scanned image vary greatly depending on the type of paper on which an image to be inspected is printed. Here, conversion to RGB values common to respective types of paper is performed, and then, conversion to RGB values for each type of paper is performed by a paper type supporting module 511, which will be described later. The RGB values common to respective types of paper is, for example, three-layer data in which each RGB signal that corresponds to sRGB, which is an RGB color space that is independent of the printer unit 206, is represented by 256 tones. sRGB in the first embodiment refers to an RGB color space standard established by International Electrotechnical Commission (IEC). The color conversion module 507 thus converts the reference image into an RGB image. Here, for example, the conversion may be performed using a table (look-up table) for conversion from CMYK to RGB as illustrated in FIG. 9A. In such a case, a pixel on a grid point is color-converted to RGB with reference to this conversion table; however, for a pixel not on a grid point, an RGB value is obtained by interpolation from neighboring grid points.

A resolution conversion module 508 is a module for converting the resolutions of a scanned image and a reference image. The scanned image and the reference image may have different resolutions at the time of input to the inspection apparatus control unit 405. The resolutions of images used in respective modules of the inspection processing module 513 and the resolution of an input image may be different. In such a case, resolution conversion is performed in the resolution conversion module 508. For example, it is assumed that the scanned image is 600 dpi in main scanning and 300 dpi in sub-scanning and the reference image is 1200 dpi in main scanning and 1200 dpi in sub-scanning. When the resolution required by the inspection processing module 513 is 300 dpi for both main scanning and sub-scanning, the respective images are scaled down, and both images are made to be images that are 300 dpi for both main scanning and sub-scanning. For the scaling method here, a known method may be used, taking into account the computational load and required accuracy. For example, if scaling in which a SINC function is used is performed, the computational load will be heavy but a high accuracy scaling result can be obtained. In addition, if scaling in which a nearest-neighboring algorithm is used is performed, the computational load will be light but a low accuracy scaling result will be obtained.

An image deformation module 509 is a module for performing image deformation of a scanned image and a reference image. There is a geometrical difference between the scanned image and the reference image due to expansion and contraction of paper at the time of printing, skewing of the paper to be printed, skewing of the printed product at the time of scanning, and the like. The image deformation module 509 corrects that geometrical difference by performing image deformation based on information obtained in the skew detection module 506 or an alignment module 510, which will be described later. For example, geometric differences are linear transformation (rotation, scaling, and shearing) and translation. A geometric difference can be expressed as an affine transform, and by obtaining affine transform parameters from the skew detection module 506 and the alignment module 510, the geometric difference can be corrected. Information obtained from the skew detection module 506 is only a parameter (skew angle information) related to the rotation of an image.

The alignment module 510 is a module for aligning a scanned image and a reference image. It is assumed that a scanned image and a reference image inputted to the alignment module 510 are images that have the same resolution. The higher the resolution of the image, the higher the accuracy of alignment; however, the computational load increases as the resolution increases. By correcting the images in the image deformation module 509 based on the parameters obtained by alignment, a scanned image and a reference image to be used in a matching module 512, which will be described later, can be obtained. Although various alignment methods are conceivable as the alignment method, in the first embodiment, a method of aligning the entire images using information of partial regions of the images rather than of the entire images is used in order to reduce the computational load. Alignment according to the first embodiment constitutes of three steps: selection of patches for alignment, alignment for each patch, and estimation of affine transform parameters. Each step will be described below.

First, the selection of patches for alignment will be described. Here, "patch" refers to a rectangular region in an image. In the selection of patches for alignment, a plurality of patches suitable for alignment are selected from the reference image. A patch that has a large corner feature in the patch is conceivable as a patch suitable for alignment. A corner feature is a feature such as there being two distinctive edges that have different directions (an intersection of two edges) in a given local neighborhood. A corner feature is a feature that expresses the strength of this edge feature. Various techniques have been devised based on differences in the modeling of "edge features".

There is a known method called Harris Corner Detection as one of the methods for calculating a corner feature. In Harris Corner Detection, a corner feature image is calculated from a horizontal differential image (the edge feature image in a horizontal direction) and a vertical differential image (the edge feature image in a vertical direction). This corner feature image is an image that represents the weaker edge feature of the two edges constituting the corner feature. Since both of the two edges should be strong edges for a corner feature, the magnitude of the corner feature is expressed according to whether an edge has a strong edge feature even if it is the relatively weaker one. The corner feature image is calculated from a reference image, and regions having a large corner feature are selected as patches suitable for alignment. When the regions having a large corner feature are simply selected as patches in order, it may be such that patches are selected only from biased regions. In such a case, the number of regions in which there is no patch in their periphery increases, and information of those regions cannot be used for image deformation, the state thus being unsuitable for performing alignment of the entire images.

Therefore, when selecting the patches, rather than simply considering the magnitude of the corner feature, it is also considered that the patches are arranged so as to be distributed in the image. Specifically, a configuration is taken such that even if a value of the corner feature of a patch candidate region is not large in the entire image, if the value is large in a local region of the image, it is selected as a patch. By doing so, it is possible to arrange the patches so as to be distributed in the reference image. Parameters for when selecting the patches include the size of the patches and the number (or density) of the patches. As the size of the patches and the number of patches increase, the accuracy of alignment increases; however, the computational load increases.

Next, the alignment for each patch will be described. Alignment for each patch is performed such that the patches for alignment in the reference image selected in the previous stage and corresponding patches in the scanned image are aligned.

There are two types of information obtained as results of the alignment: the first is the center coordinates (refpX_i, refpY_i) of an i-th (i=1 to N; N is the number of patches) patch for alignment in the reference image and the second is a position (scanpX_i, scanpY_i) in the scanned image corresponding to the center coordinates (refpX_i, refpY_i). The alignment method may be any method so long as it is a shift amount estimation method by which a relationship between (refpX_i, refpY_i) and (scanpX_i, scanpY_i) is obtained. For example, a method such as that in which Fast Fourier Transform (FFT) is used to estimate a shift amount by bringing patches corresponding to the patches for alignment into a frequency domain and obtaining a correlation therein.

Finally, the estimation of affine transform parameters will be described. An affine transform is a coordinate transformation method expressed by an equation in FIG. 9C.

In this equation, there are six types of affine transform parameters: a, b, c, d, e, and f. Here, (x, y) corresponds to (refpX_i, refpY_i) and (x', y') corresponds to (scanpX_i, scanpY_i). Using this correspondence obtained from N patches, the affine transform parameters are estimated. For example, the affine transform parameters can be obtained using the least squares method. The reference image or the scanned image is deformed in the image deformation module 509 based on the obtained affine transform parameters. An image corrected for alignment is thus created, and a set of the reference image and the scanned image to be used in the matching module 512 can be made.

The paper type supporting module 511 is a module for performing processing according to the type of paper of the reference image. Specifically, the paper type supporting module 511 performs color conversion according to the type of paper and rotation of the image according to the orientation of paper. In this module, image processing is performed on the reference image according to the type and orientation of the paper based on the inspection control information stored in advance in the memory unit 504 and the paper information used for printing transmitted from the controller 21 of the image forming apparatus 100. Regarding color conversion, the color conversion may be performed in the color conversion module 507 according to the type of paper based on the reference image converted into an RGB color space common to all types of paper. Regarding color conversion for each type of paper, the conversion is performed targeting RGB values read by the inspection sensor 403 for each type of paper. Regarding color conversion according to the type of paper, for example, the conversion may be performed using a table (look-up table) for color conversion from RGB to RGB as illustrated in FIG. 9B. A plurality of look-up tables may be held and switched according to the type of paper.

Figure 7:
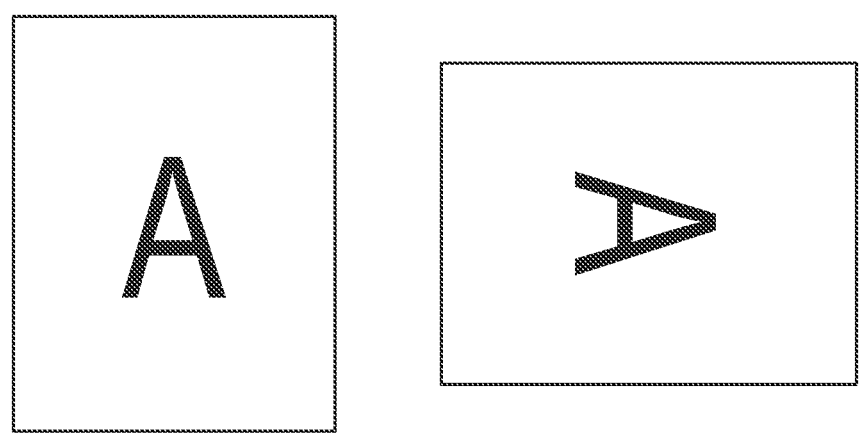
FIG. 7 is a diagram for explaining orientations in which paper is stored in a sheet stocker in the first embodiment.

The paper type supporting module 511 then rotates the reference image. In this case, the image is rotated by 90 degrees according to the notified orientation of the printed product (paper). For example, as illustrated in FIG. 7, even if the data is the same, a scanned image in which the image is rotated is obtained depending on the orientation of storage of paper in the sheet stocker. Therefore, it is necessary to rotate the reference image according to the orientation of the scanned image.

The matching module 512 is a module for matching the scanned image and the reference image processed by the paper type supporting module 511. It is assumed that the scanned image and the reference image inputted to the matching module 512 are images that have the same resolution. It is also assumed that the reference image or the scanned image is corrected by the image deformation module 509 based on the information obtained by the alignment module 510 such that the images can be compared. The matching module 512 performs matching processing using the reference image and the scanned image. At this time, the matching processing is performed based on the parameters notified from the operation/display unit 505.

The operation/display unit 505 is a touch screen user interface and receives settings for processing in the inspection processing module 513 from the user. For example, the operation/display unit 505 displays a settings screen as illustrated in FIG. 8 and receives settings for the image processing by the inspection processing module 513 from the user.

Figure 8:
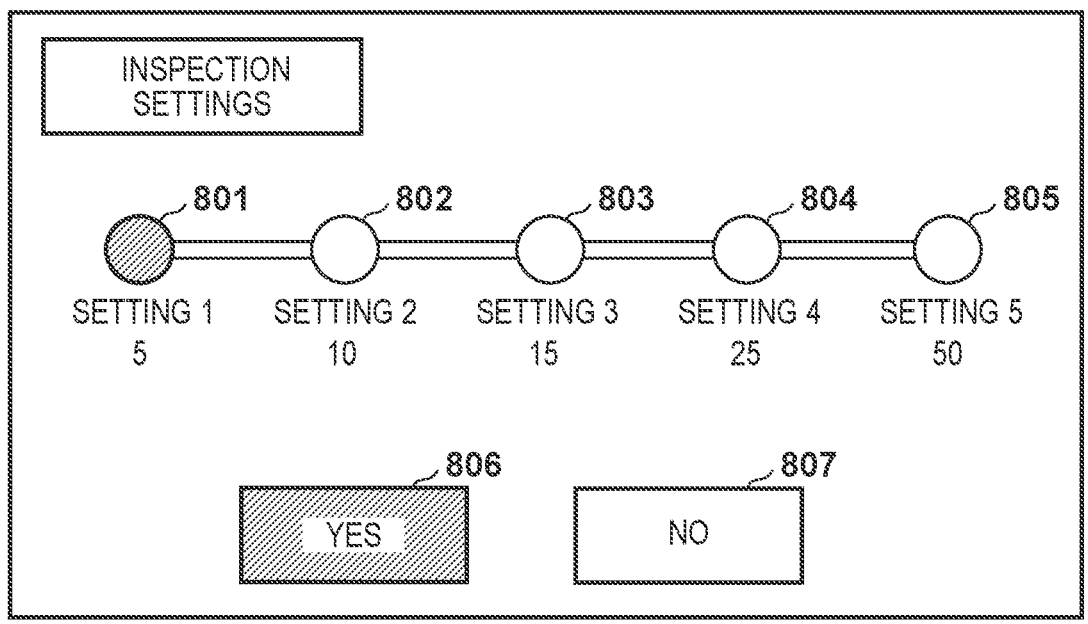
FIG. 8 depicts a view illustrating an example of an inspection settings screen to be displayed on an operation/display unit of the inspection apparatus according to the first embodiment.

FIG. 8 depicts a view illustrating an example of an inspection settings screen to be displayed on the operation/display unit 505 of the inspection apparatus 200 according to the first embodiment.

Here, buttons 801 to 805 are provided as inspection settings that can be adjusted by the user, and the buttons 801 to 805 correspond to setting 1 to 5. The user can perform the inspection setting corresponding to the selected button by selecting any of these buttons and pressing a "yes" button 806. A "no" button 807 is a button for cancelling the settings on this screen.

Here, when the button 801 is selected and the "setting 1" is set, the matching module 512 detects a defect when a color difference, such as staining and damage, determined by the inspection of the scanned image is "5" or more. Meanwhile, when the button 805 is selected and the "setting 5" is set, the matching module 512 detects a defect when the color difference, such as staining and damage, determined by the inspection of the scanned image is "50" or more. As described above, the smaller the setting number of the inspection setting, the smaller the color difference, such as staining and damage, at which the matching module 512 detects a defect. By selecting a button corresponding to any one of the settings 1 to 5, the user can thus perform inspection setting in the matching module 512. Here, a color difference parameter is associated in advance with each setting value. Accordingly, the color difference parameter corresponding to the setting value selected by the user on the inspection settings screen is notified to the matching module 512.

In the first embodiment, a color difference, which is staining and damage to be detected, has been adjusted using an inspection setting value; however, the present invention is not limited thereto, and for example, it may be the magnitude (size) of staining and damage to be detected. For example, a configuration may be taken so as to be able to adjust the magnitude (size) in a range of 0.1 mm to 3 mm, for example.

Inspection processing will be described below with reference to FIG. 6.

Figure 6:
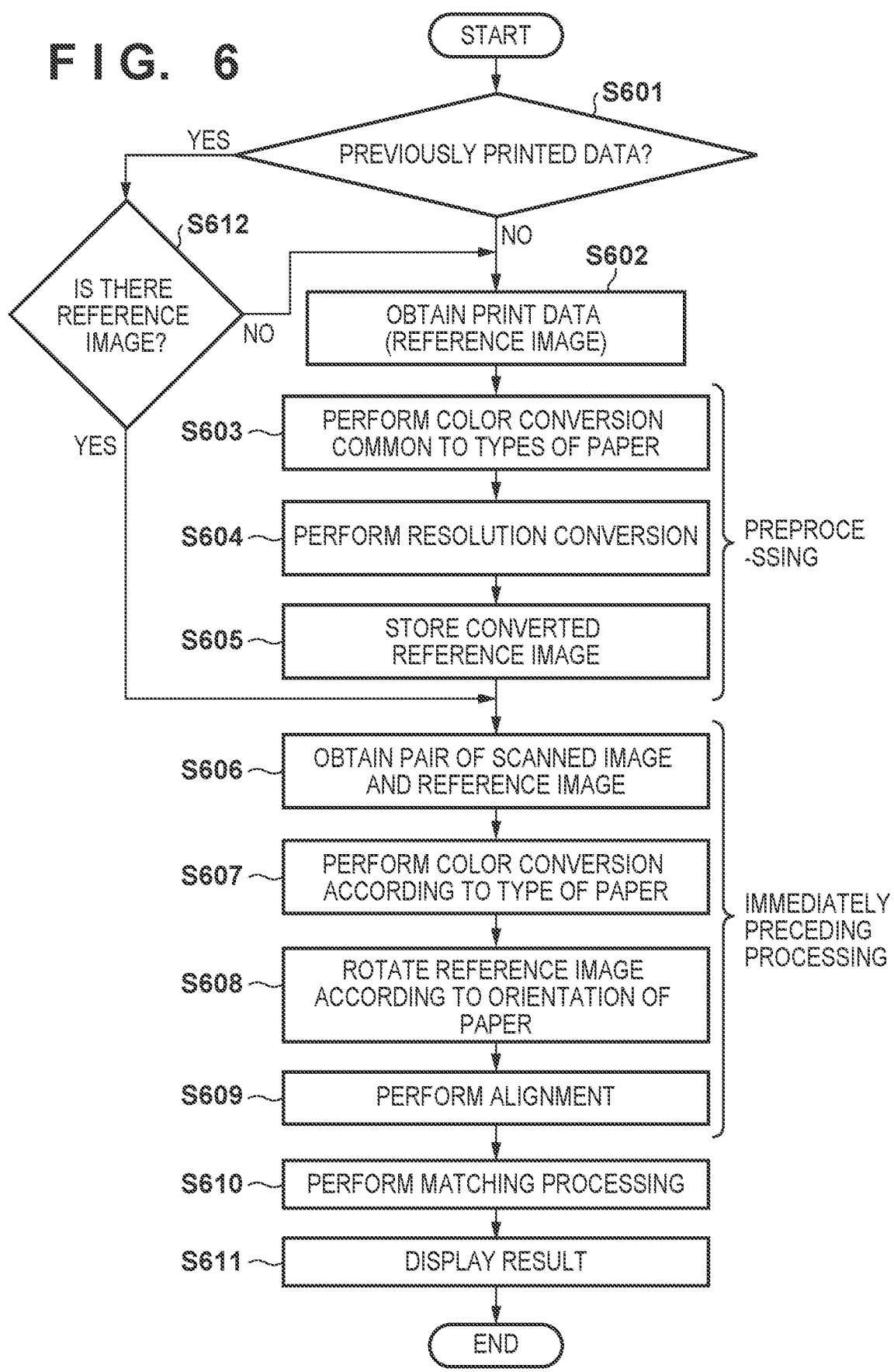
FIG. 6 is a flowchart for explaining inspection processing by the inspection apparatus according to the first embodiment.

FIG. 6 is a flowchart for explaining inspection processing by the inspection apparatus 200 according to the first embodiment. The processing described in this flowchart is realized by the CPU 515 of the control unit 503 executing a program stored in the memory unit 504.

First, in step S601, the CPU 515 determines whether data to be printed in the current print job is previously printed data based on the inspection control information. Here, in order to determine whether it is previously printed data, a reprint flag or the like, for example, may be provided in the inspection control information. If it is determined to be previously printed data, the processing proceeds to step S612, and if it is determined not to be previously printed data, the processing proceeds to step S602. In step S602, the CPU 515 receives a print job via the communication unit 502, obtains data of the print job, and stores it in the memory unit 504.

The CPU 515 then performs preprocessing from step S603 to step S605. The CPU 515 performs processing on a reference image received from the image forming apparatus 100 and held in the memory unit 504 via the communication unit 502. The processing here is performed independently of the paper, and a reference image obtained as a result is stored again in the memory unit 504. First, in step S603, the CPU 515 performs color conversion on the reference image. Here, the color conversion module 507 converts the reference image into RGB values common to respective types of paper. Next, the processing proceeds to step S604, and the CPU 515 performs resolution conversion on the reference image. Here, the resolution conversion module 508 converts the resolution of the reference image to the resolution required by the inspection processing module 513. Then, the processing proceeds to step S605, and the CPU 515 stores the converted reference image to the memory unit 504 with ID (identification information). This ID is assumed to be included in the inspection control information and may be a sequence of numbers, such as "202208010001" representing the date and time of printing, so long as the reference image is uniquely recognized. For example, the identification information of the reference image may be specified in a print job that uses the reference image.

It is assumed that the reference image inputted here is a CMYK image that is 1200 dpi in main scanning and 1200 dpi in sub-scanning. By the above-described preprocessing, it is converted to an RGB image that is 300 dpi in both main scanning and sub-scanning and common to the respective types of paper, and the image size thus becomes very small. Specifically, the resolution is 1/16 and the number of channels is reduced by 1 channel. Therefore, the capacity of the memory unit 504 can be kept small.

Next, from step S606 to step S609, the CPU 515 performs immediately preceding processing such that the reference image is an image that can be compared with the scanned image of the image printed in the inputted job. In step S606, the CPU 515 selects a pair of the scanned image to be inspected and the reference image using the inspection control information received from the image forming apparatus 100 and held in the memory unit 504 via the communication unit 502. Here, regarding the reference image, a corresponding reference image is obtained from the memory unit 504 based on the ID described in the inspection control information. Then, based on the paper information used for printing the image in the scan transmitted from the controller 21, color conversion is performed according to the type of paper such that the scanned image can be compared with the reference image. Since the type and orientation of paper is not finalized until the print job is executed, the paper information used for printing is notified after the print job is executed.

Next, in step S607, the CPU 515 performs color conversion processing by the paper type supporting module 511 according to the type of paper of the printed product. Here, by converting the color space of the reference image that has been converted to RGB values common to the types of paper to the color space according to the type of paper, determination for matching with the scanned image can be accurately performed.

Next, the processing proceeds to step S608, and the CPU 515 rotates the reference image according to the orientation of paper in the paper type supporting module 511. The orientation of paper is obtained from the inspection control information, and the reference image is rotated such that the orientations of the scanned image and the reference image coincide. Next, the processing proceeds to step S609, and the CPU 515 performs alignment using the scanned image and the reference image. Here, first, the CPU 515 obtains affine transform parameters by performing processing on the scanned image and the reference image in the alignment module 510. Then, the CPU 515 makes the reference image usable for matching by making the coordinate system of the reference image to be the same as that of the scanned image by performing reference image correction processing in the image deformation module 509 using the affine transform parameters obtained from the alignment module 510.

Then, the processing proceeds to step S610, and the CPU 515 performs matching and determination processing using the scanned image and the reference image obtained in step S609. At this time, the CPU 515 performs processing on the scanned image and the reference image in the matching module 512. A reference value for determining whether there is an image defect at this time is based on the setting value set in the above-described inspection settings screen of FIG. 8. Next, the processing proceeds to step S611, and the CPU 515 displays a result of the inspection processing of step S610 on the operation/display unit 505. At this time, simply displaying an image of the final determination result makes it difficult for the user to recognize the image defect. Therefore, the final determination result image is composited with the scanned image and displayed on the operation/display unit 505. Regarding this compositing, any compositing method may be used so long as the compositing method is that in which the location of the image defect is easily recognized. For example, a configuration may be taken so as to display in in the image of the final determination result the portion of the image defect in red on the scanned image.

Meanwhile, when it is determined in step S601 that the data to be printed in the current print job is previously printed data, the processing proceeds to step S612 and the CPU 515 determines whether the reference image of the previously printed data is stored in the memory unit 504. This determination can be made by determining whether the reference image ID described in the inspection control information is stored in the memory unit 504. If there is a coinciding ID, the reference image corresponding to that ID is employed and the processing proceeds to step S606; otherwise, the processing proceeds to step S602 in order to generate a reference image.

Here, a case of previously printed data will be described. When using previously printed data, the preprocessed data stored in the memory unit 504 in step S605 is employed, transition is made to step S606, and a reference image is generated. Whether it is previously printed data can be identified by determining in step S612 whether the ID stored with the reference image coincides with the ID described in the inspection control information of the inputted print job. Even if the type and/or orientation of paper is changed from those of the previous print job in the inputted print job, the reference image common to the types of paper generated during previous printing is stored. Accordingly, by using the stored reference image, it is possible to generate a reference image corresponding to the paper of the printed product to be inspected with minimal processing.

The stored reference image common to the types of paper may be provided with a storage expiration date in view of the capacity of the memory unit 504 or change in a profile according to the state of the image forming apparatus. A configuration may be taken so as to ensure a storable region in a storage unit by thus deleting the reference images generated before a predetermined period from the storage unit.

As described above, according to the embodiment, a reference image common to the types of paper generated during previous printing is stored such that it can be used in a subsequent corresponding job. Thus, if a subsequent print job corresponds to the stored reference image, even if the type and/or orientation of paper is changed in the subsequent print job, it is possible to perform image matching simply by performing processing for changing the type and/or orientation of paper on that corresponding reference image. Thus, the time required to generate a reference image is reduced, and matching of the scanned image and the reference image can be performed promptly.

Variation of First Embodiment

Image processing related to a variation of the first embodiment of the present invention will be described below.

In the above-described first embodiment, a concrete example for when reprinting is performed has been described; however, the type and/or orientation of paper change not only according to the job. In the image forming apparatus 100, if paper runs out during printing, a different sheet stocker may be automatically selected. There also are cases where although the type of paper is different, a similar type of paper is automatically fed or cases where paper whose orientation is different is fed.

Accordingly, in this variation, it is determined whether a corresponding reference image is stored not only when a job is inputted but also when the sheet stocker to be used in printing in the image forming apparatus is automatically or manually switched, and if it is stored, processing similar to that of the above-described first embodiment will be performed.

Figure 10:
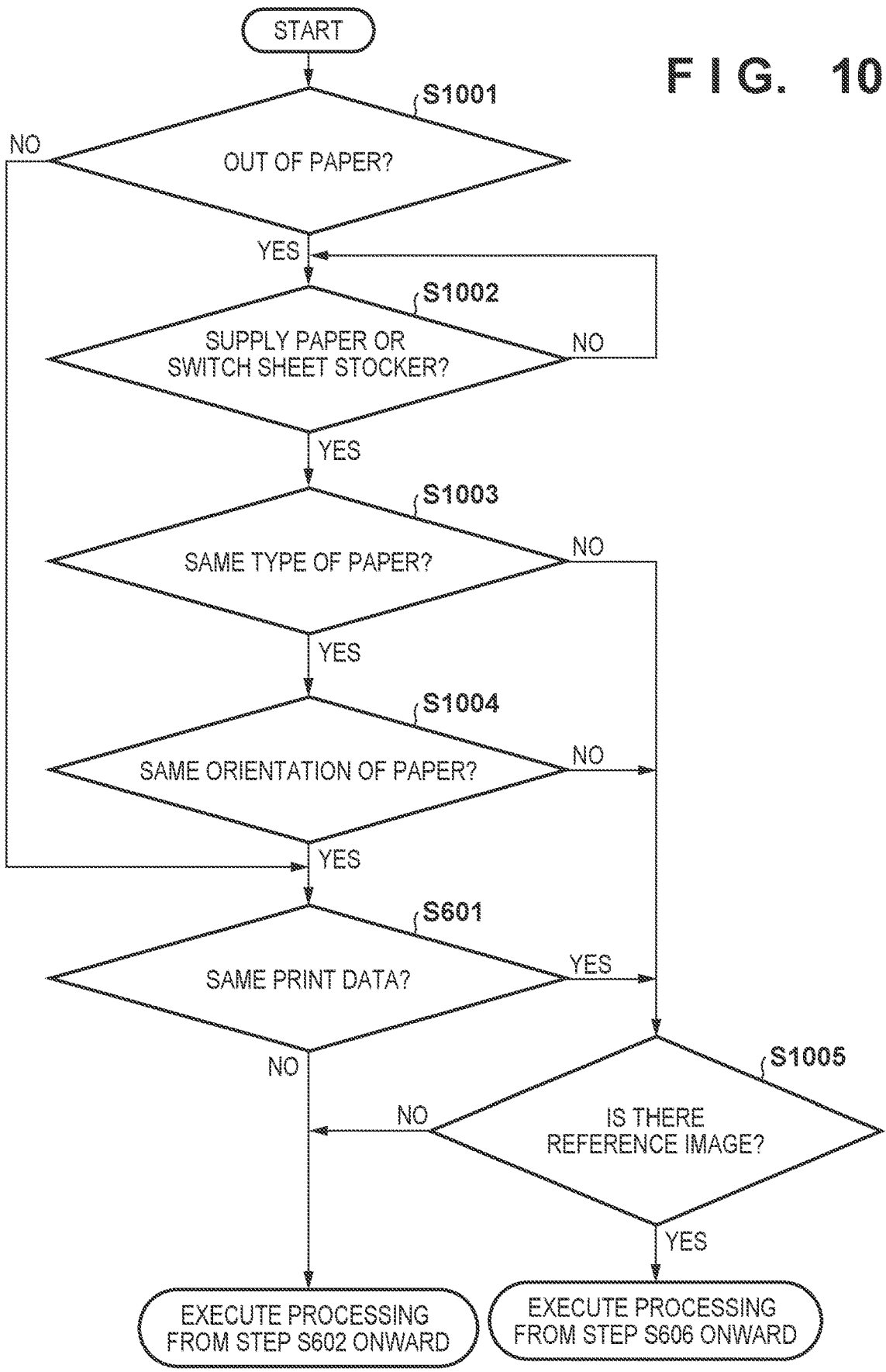
FIG. 10 is a flowchart for explaining inspection processing by the inspection apparatus according to a variation of the first embodiment.

FIG. 10 is a flowchart for explaining inspection processing by the inspection apparatus 200 according to this variation. The processing described in this flowchart is realized by the CPU 515 of the control unit 503 executing a program stored in the memory unit 504. In FIG. 10, the same processing as that in above-described FIG. 6 is denoted by the same reference numerals, and description thereof will be omitted.

First, in step S1001, the CPU 515 determines whether paper has run out, and if paper has run out, the processing proceeds to step S1002, and waits until the paper outage is resolved by paper being supplied or the sheet stocker to be used being switched. When the paper is thus supplied or the sheet stocker to be used is thus switched in step S1002, the processing proceeds to step S1003, and the CPU 515 determines whether paper to be newly fed is the same type of paper. If it is determined in step S1003 that it is a different type of paper, the processing proceeds to step S1005; however, if it is determined in step S1003 that it is the same type of paper, the processing proceeds to step S1004, and it is determined whether the orientation of paper is the same as the orientation of paper printed thus far. If it is determined in step S1004 that the orientation of paper is different, the processing proceeds to step S1005; otherwise, the process proceeds to step S601. In step S1005, it is determined whether a reference image corresponding to the print data is stored as in step S612 of FIG. 6, and if the reference image is stored, the processing proceeds to step S606 of FIG. 6 and color conversion according to the new type of paper is performed. Although step S601 is provided in FIG. 10, a configuration may be taken so as to omit step S601 and proceed to step S602. In addition, a configuration may be taken such that if it is determined in step S1005 that there is a corresponding reference image and only the type of paper is different, the processing proceeds to step S606, and if only the orientation of paper is different, processing proceeds from step S1005 to step S607.

Thus, even if the type and/or orientation of paper is changed during printing, image matching can be performed by simply performing processing for changing the type and/or orientation of paper on a corresponding reference image. Thus, it is possible to efficiently perform processing for generating a reference image while maintaining high speed for when performing image matching.

In addition, a configuration may be taken so as to not only store the reference image common to the types of paper generated in previous printing in the apparatus itself but also transmit that reference image to another inspection apparatus such that it can be used in a plurality of inspection apparatuses or inspection systems.

In addition, by making it possible to select whether to create and store a common reference image, a configuration may be taken so as to immediately execute resolution conversion (step S604), color conversion according to the type of paper (step S606), and color conversion according to the orientation of paper (step S607) when not storing that reference image.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (the CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (the RAM), a read only memory (the ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-169399, filed Oct. 21, 2022, which is hereby incorporated by reference herein in its entirety.

What is claimed is:

1. An inspection apparatus operable to inspect an image printed on paper, the inspection apparatus comprising:
a controller including one or more memories storing instructions and one or more processors configured to execute the instructions to:
perform first image processing that is not according to a type of the paper on image data used in printing the image;
store the image data for which the first image processing has been performed as a reference image;
determine whether a first reference image corresponding to the reference image, which is usable in a job to be inspected, is stored;
upon determining that the first reference image is stored, perform second image processing that is according to the type of the paper on the first reference image to convert the first reference image into a second reference image corresponding to the job;
obtain a scanned image by reading an image of paper on which printing has been performed according to a print job; and
perform processing for matching the obtained scanned image and the second reference image.

2. The inspection apparatus according to claim 1, wherein the image data includes identification information of the reference image.

3. The inspection apparatus according to claim 1, wherein the controller determines whether the corresponding first reference image is stored based on inspection control information and identification information included in the job.

4. The inspection apparatus according to claim 1, wherein the controller determines that the first reference image is stored in a case where inspection control information included in the job indicates reprinting.

5. The inspection apparatus according to claim 1, wherein the first image processing includes processing for converting a color space of the image data into a color space common to a plurality of types of paper.

6. The inspection apparatus according to claim 5, wherein image data whose color space is common to the plurality of types of paper is image data of an RGB color space independent of a printer engine used for printing of the paper.

7. The inspection apparatus according to claim 1, wherein the first image processing includes processing for converting a resolution of the image data.

8. The inspection apparatus according to claim 1, wherein the second image processing includes processing for converting the first reference image to the second reference image whose color space corresponds to the type of the paper on which printing has been performed according to the print job.

9. The inspection apparatus according to claim 1, wherein the second image processing includes processing for converting the first reference image to the second reference image according to an orientation of the paper on which printing has been performed according to the print job.

10. The inspection apparatus according to claim 1, wherein the second image processing includes alignment processing for aligning the scanned image and the second reference image.

11. The inspection apparatus according to claim 10, wherein:
the controller is configured to execute the instructions to detect skew feeding of the paper on which printing has been performed according to the print job, and
the alignment processing aligns the scanned image and the second reference image based on the detected skew feeding of the paper.

12. The inspection apparatus according to claim 1, wherein in a case where the first reference image is not stored, the controller is configured to execute the instructions to generate another second reference image by performing the second image processing on another reference image generated by performing the first image processing on another image data.

13. The inspection apparatus according to claim 1, wherein the controller determines whether the first reference image is stored in response to a sheet stocker that feeds paper on which printing is to be performed according to the print job being switched.

14. The inspection apparatus according to claim 1, wherein the controller determines whether the first reference image is stored in response to a type of paper on which printing is to be performed according to the print job being changed.

15. The inspection apparatus according to claim 1, wherein the controller determines whether the first reference image is stored in response to an orientation of paper on which printing is to be performed according to the print job being changed.

16. The inspection apparatus according to claim 1, wherein the first reference image is smaller in data amount than the image data used in printing the image.

17. The inspection apparatus according to claim 1, wherein the controller is configured to execute the instructions to set a reference value for determining whether an image defect exists based on a result of the matching.

18. The inspection apparatus according to claim 17, wherein the controller is further configured to display a result of the determination as to whether an image defect exists.

19. A method of controlling an inspection apparatus operable to inspect an image printed on paper, the method comprising:
   performing first image processing that is not according to a type of the paper on image data used in printing the image;
   storing the image data for which the first image processing has been performed as a reference image in a memory;
   determining whether a first reference image corresponding to the reference image, which is usable in a job to be inspected, is stored in the memory;
   upon determining that the first reference image is stored in the memory, performing second image processing that is according to the type of the paper on the first reference image to convert the first reference image into a second reference image corresponding to the job;
   obtaining a scanned image by reading an image of paper on which printing has been performed according to a print job; and
   performing processing for matching the obtained scanned image and the second reference image.

20. A non-transitory computer-readable storage medium storing a program executable by a processor to execute a method of controlling an inspection apparatus operable to inspect an image printed on paper, the method comprising:
   performing first image processing that is not according to a type of the paper on image data used in printing the image;
   storing the image data for which the first image processing has been performed as a reference image in a memory;
   determining whether a first reference image corresponding to a reference image, which is usable in a job to be inspected, is stored in the memory;
   upon determining that the first reference image is stored in the memory, performing second image processing that is according to the type of the paper on the first reference image to convert the first reference image into a second reference image corresponding to the job;
   obtaining a scanned image by reading an image of paper on which printing has been performed according to a print job; and
   performing processing for matching the obtained scanned image and the second reference image.

\* \* \* \* \*